United States Patent

[11] 3,617,757

[72] Inventors Kenneth John Burr;
 Terence Wilfrid Webb, both of Cornwall, England
[21] Appl. No. 863,560
[22] Filed Oct. 3, 1969
[45] Patented Nov. 2, 1971
[73] Assignee English Clays Lovering Pochin & Company Limited
 Cornwall, England
[32] Priority Oct. 9, 1968
[33] Great Britain
[31] 47,946/68

[54] MEASUREMENT OF THE CONCENTRATION OF SOLIDS IN FLUIDS
 8 Claims, 5 Drawing Figs.
[52] U.S. Cl. .................................................. 250/218,
 356/208, 250/239
[51] Int. Cl. .................................................. G01n 21/26
[50] Field of Search .......................................... 250/218,
 216, 226, 239; 356/208, 207, 180

[56] References Cited
UNITED STATES PATENTS

| | | | | |
|---|---|---|---|---|
| 3,177,760 | 4/1965 | Albert | | 250/218 X |
| 3,263,553 | 8/1966 | Baruch | | 250/218 |
| 3,300,646 | 1/1967 | Casebeer | | 250/216 X |
| 3,319,514 | 5/1967 | McAllister | | 356/208 |
| 3,417,251 | 12/1968 | Leonard et al. | | 250/218 |
| 3,457,407 | 7/1969 | Goldberg | | 250/218 X |

*Primary Examiner*—Walter Stolwein
*Attorney*—Larson, Taylor and Hinds

ABSTRACT: An apparatus for determining the concentration of solids in suspension in a fluid. The apparatus comprises a source of light, a measurement chamber to contain a quantity of the suspension and to admit thereinto only a single beam of light from said source of light, a first photocell to receive light originating from said source of light and reflected through an angle of approximately 180° by solid particles in the suspension and to produce a signal proportional to the intensity of the reflected light, a second photocell to receive light directly thereon from said source of light and to produce a signal proportional to the intensity of the light, and means for comparing the signals produced by the first and second photocells as a function of the solids concentration of the suspension in the measurement chamber.

PATENTED NOV 2 1971 3,617,757

MEASUREMENT OF THE CONCENTRATION OF SOLIDS IN FLUIDS

BACKGROUND OF THE INVENTION

This invention relates to apparatus for determining the concentration of solids suspended in a fluid.

It is often desired to measure the concentration of solids suspended in a fluid, for example in the overflow from thickening tanks or in the filtrate from a pressure-filtering installation or in an aqueous effluent which is to be discharged into a river or stream, so as to give a warning if the concentration of solids in the fluid rises above a critical level. In one known apparatus for carrying out such a measurement, the solids concentration of suspension is determined by measuring photo-electrically the attenuation of a beam of light passed through a sample of the suspension, but an instrument of this type has a major drawback in that its discrimination is very poor at low solids concentrations, i.e. at solids concentrations below about 200 parts per million. In another known apparatus, the solids concentration of a suspension is determined by comparing the amount of transmitted light with that of light reflected at an angle of approximately 90°. However, the apparatus is complex and very expensive.

It is an object of the present invention to provide an apparatus of simple construction which can be used to determine the concentration of solids in suspension in a fluid, more especially when the solids concentration is less than about 200 parts per million.

SUMMARY OF THE INVENTION

Accordingly, the present invention provides an apparatus, for determining the concentration of solids in suspension in a fluid, which apparatus comprises a source of light, a measurement chamber constructed and arranged so that, in use, said measurement chamber can contain a quantity of the suspension and can admit thereinto only a single beam of light from said source, a first photocell constructed and arranged to receive light originating from said source and reflected through an angle of approximately 180° by solid particles in the suspension and to produce a signal proportional to the intensity of the reflected light, a second photocell arranged to receive light directly thereon from said source of light and to produce a signal proportional to the intensity of the light, and means for comparing the signals produced by the first and second photocells as a function of the solids concentration of the suspension in the measurement chamber.

With the apparatus of the present invention the effective length of the path of the light through the suspension in the measurement chamber varies with the concentration of solids in the suspension. Thus, at low solids concentrations the path length of the light is long, whereas at high solids concentrations the path length is short. This results in good sensitivity at low solids concentrations.

It will be appreciated that the apparatus of the present invention gives its greatest accuracy when used with suspensions of particles which are light in color, e.g. white pigment particles.

DESCRIPTION OF THE PREFERRED EMBODIMENTS

The measurement chamber is advantageously of the flow-through type, i.e. a suspension can be supplied continuously to the measurement chamber through an inlet port and can flow out continuously through an outlet port. When using the apparatus, it is important to fill the measurement chamber with the suspension or at least to maintain therein sufficient suspension to ensure that a suspension/air interface does not intersect the beam of light transmitted through the suspension in a way which affects the amount of light reflected back to the first photocell. As an alternative to the flow-through type of measurement chamber, there can be employed a measurement chamber which is adapted to be filled with a fixed volume of the suspension under examination for a time sufficient to make a measurement, and then emptied. Advantageously, the measurement chamber is of generally regular, preferably cylindrical, shape and has a diameter or width such that only an insignificant proportion of the light reflected by the sidewalls is incident upon the first photocell. In general, it has been found that the diameter or width of the measurement chamber is preferably at least 3 inches. The beam of light can be admitted into the measurement chamber through a window mounted in one end wall of the measurement chamber. Preferably, the beam of light is directed along the axis of the measurement chamber. Advantageously, the window incorporates the first and second photocells. Preferably, the end wall of the measurement chamber facing the window consists of or is provided with a light-reflecting surface, e.g. is made from white poly (vinyl chloride) or is provided with a coat of white paint, so that even when the measurement chamber is filled with clear water there is still some reflected light, which facilitates the precise calibration of the apparatus on clear water. Advantageously, the length of the measurement chamber is such that, with clear water in the measurement chamber, the intensity of the light reflected back from the end wall is equal to the intensity of the light reflected back from a suspension containing about 10 parts per million of solids in a measurement chamber of infinite length. In general, it is found that satisfactory results are obtained when the length of the measurement chamber, when measured between the window and the opposite end wall of the measurement chamber, is at least 2 inches and not more than 20 inches, but the optimum distance depends on the power of the light source, the diameter of the beam of light on entry into the measurement chamber and the range of solids concentration which it is desired to examine. For example, with a 6-watt lamp giving a beam having a diameter of 1 inch on entry into the measurement chamber and being used to measure solids concentrations ranging from 0–1000 p.p.m., the length of the measurement chamber is advantageously in the range of from 6 to 12 inches. The measurement chamber is preferably oriented, in operation, so that the light beam is inclined to the vertical, and is preferably substantially horizontal, in order to avoid the buildup of air bubbles or oil films on the window which tend to occur if the beam of light is directed vertically downwards. The linear rate of flow of suspension through the measurement chamber should be sufficiently high, at least 0.04 feet per second, to avoid sedimentation of material in the measurement chamber, to avoid fouling of the window, and to achieve a rapid response to changes in the solids concentration of an incoming suspension, but not so high that cavitation occurs or a large number of air bubbles are formed in the suspension. For example, if the measurement chamber is of cylindrical shape and has an internal diameter of about 4 inches the linear rate of flow of suspension preferably lies in the range of from 0.06 feet per second to 0.16 feet per second (which corresponds to a volumetric flow rate of from 2 to 6 gallons per minute).

As noted above, the first and second photocells are advantageously embedded in a transparent, solid material which constitutes the window through which the light is admitted to the measurement chamber. Examples of suitable transparent, solid materials are poly(methacrylates), clear epoxy resins and clear polyester resins. The first photocell, which measures the intensity of the reflected light, is preferably set back from the inner surface of the window by a distance of at least one-eighth inch so that any shadow of the photocell cast by the light from the source falls almost entirely within the material of the window and does not project substantially into the suspension. The first and second photocells are preferably of the photoresistive type so that their response can be detected by a resistance bridge circuit. The out-of-balance signal from the bridge circuit can be arranged to give a direct reading of the solids concentration of the suspension in parts per million or can be arranged to record on a suitable chart recorder. An alarm system can be incorporated in the apparatus if required to give a visible or audible warning when the solids concentration of the suspension reaches an undesirably high level. It is also possible to arrange for the apparatus to be linked to appropriate control equipment so that suitable corrective action can be initiated automatically when the solids concentration of the suspension reaches an undesirably high level. Preferably, a neutral optical filter, i.e. a filter that attenuates light of all wave lengths equally, is mounted between the second photocell, which measures the intensity of the light received directly from the source, and the source of light so that the intensity of the light received by the second photocell is of the same order as that received by the first photocell.

The power of the light source must be sufficient to give an appreciable orifice. light scattered back from the solid particles in the suspension, but must not be so great as to cause undue heating of the apparatus. It is found that the power of the light source is preferably in the range as from 3 to 12 watts.

Advantageously, the window, photocells, light source and associated equipment are contained in a measuring head which can be fitted into the measurement chamber through a suitable orifice.

For a better understanding of the invention and to show how the same may be carried into effect, reference will now be made, by way of example, to the accompanying drawings in which.

Figure 1:
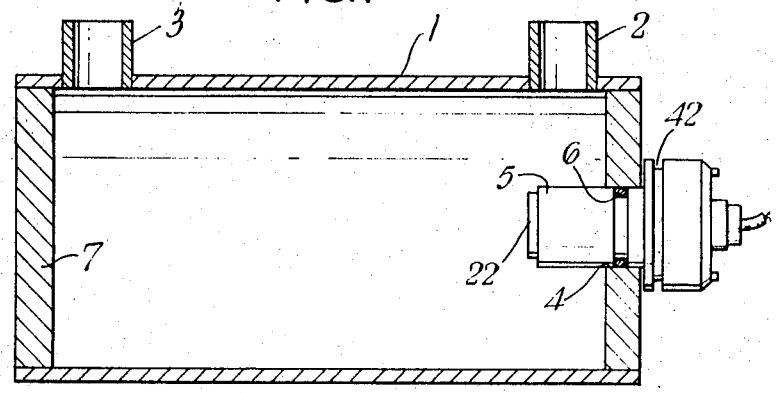
FIG. 1 shows diagrammatically an embodiment of apparatus in accordance with the invention.

The apparatus shown in FIG. 1 comprises a measurement chamber 1 and measuring head 5. The measurement chamber 1 is in the form of a cylindrical vessel which has an internal diameter of 4 inches and is provided with an inlet port 2, an outlet port 3 and an orifice 4 in which there is fitted the measuring head 5. The measuring head 5 includes a window 22 in the form of a block of transparent resin. An O-ring seal 6 is provided between the measurement chamber 1 and the measuring head 5. The end wall 7 of the measurement chamber 1, which wall faces the measuring head 5, is painted white and the length of the measurement chamber between the end wall 7 and the outside surface of the window 22 is 7 inches. In use, a suspension of solids in a liquid which is to be examined is passed through the measurement chamber at the rate of about 5 gallons per minute.

Figure 2:
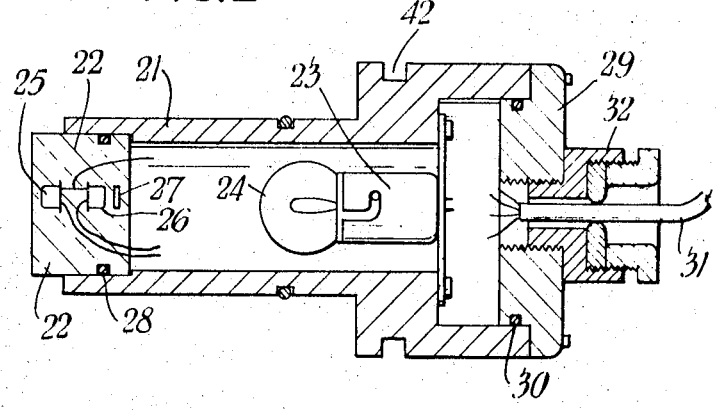
FIG. 2 shows in greater detail part of the apparatus shown in FIG. 1.

The measuring head 5 is shown in greater detail in FIG. 2 and comprises an essentially cylindrical brass body 21, in one end of which is cemented a cylindrical window 22 made from a clear epoxy resin, for example that manufactured by CIBA (A.R.L.) Ltd. and sold under their trademark "ARALDITE" or that manufactured by EMERSON-CUMING INC. and sold under their trademark "STYCAST." At the other end of the brass body 21 there is mounted, in a lamp holder 23, a 6-watt electric lamp 24. The cylindrical resin block of window 22 is drilled to accommodate a cadmium sulfide first photocell 25, a cadmium sulfide second photocell 26 and a neutral optical filter 27. The first photocell 25 is set back about one-eighth inch from the outside face of the window 22 and the second photocell 26 faces the lamp 24. The neutral optical filter 27 is provided so that the second photocell 26 has a resistance which is of the same order as that of the photocell 25. The two photocells 25 and 26 and the filter 27 are fixed in place by surrounding them with a solution of epoxy resin which is then left to harden. An O-ring seal 28 is provided between the brass body 21 and the window 22. An end cap 29 is screwed to the end of the brass body 21. An O-ring seal 30 is provided to form a seal between the end cap 29 and the brass body 21. A cable 31 connecting the components of the measuring head 5 to the electronic unit passes out through a cable gland 32 which forms a liquid-tight seal. A groove 42 is provided in the body of the measuring head 5 to enable the measuring head to be secured to the measurement chamber by means of turnbuckles (not shown).

Figure 3:
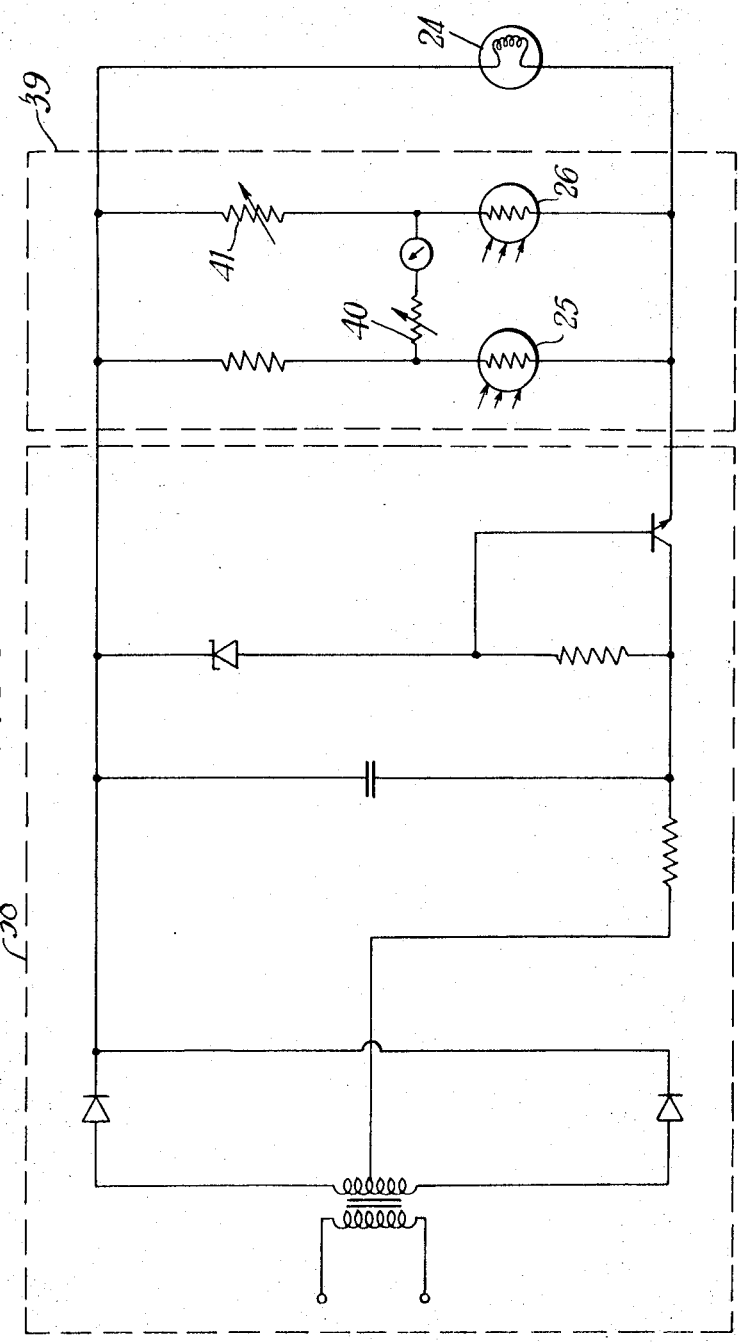
FIG. 3 shows an electric circuit diagram for the apparatus of FIGS. 1 and 2.

The circuit diagram for the electronic unit is shown in detail in FIG. 3, from which it can be seen that the unit comprises a stabilized DC supply 38 which supplies power for the lamp 24 and a bridge circuit 39 which is fed from the same supply. The range of the apparatus can be changed very simply by adjusting variable resistors 40 and 41 in the bridge circuit. The first, or measuring, photocell 25 receives light reflected back from any suspended particles which are in the light path. Thus, the more particles there are present, the more light there is reflected back and the greater is the out-of-balance signal from the bridge. The second, or reference, photocell 26 serves the purpose of minimizing the effects of changes in temperature and lamp brightness. If the instrument is installed permanently for the continuous passage through the measurement chamber of a suspension, for example an effluent whose solids content it is required to monitor, the front of the resin block forming window 22 must be cleaned at intervals ranging from 1 to 7 days depending on the nature of the suspension.

In a modification (not shown) of the apparatus shown in FIGS. 1 and 2, the axis of the measurement chamber, in operation, is inclined to the horizontal, and the outlet port is positioned in the chamber so that, in operation, it is at the lowest point of the measurement chamber, the inlet port being positioned in the upper region of the measurement chamber remote from the outlet port. In this way any solid material which sediments in the measurement chamber is swept out of the chamber by the flow of suspension through the outlet port. It is also advantageous with such an arrangement to provide at the uppermost part of the measurement chamber an auxiliary outlet tube which is connected externally of the chamber to a pipe carrying suspension from the outlet port; this permits the escape of air entrapped in the measurement chamber and also prevents the emptying of the measurement chamber by a syphoning action if the flow of suspension through the inlet port is interrupted.

Figure 4:
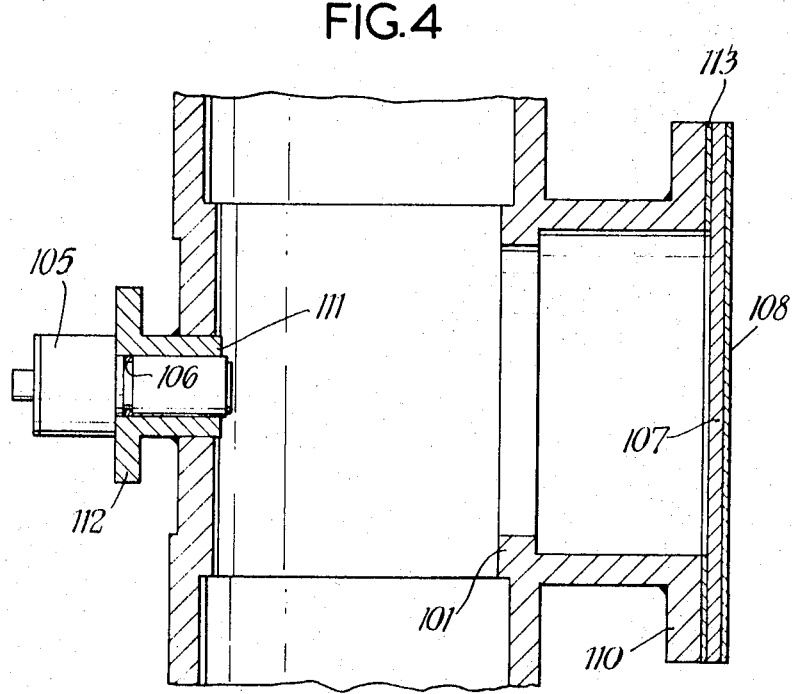
FIG. 4 shows diagrammatically a second embodiment of apparatus in accordance with the invention.

Referring now to FIG. 4, there is shown an apparatus comprising a measuring head 105 mounted in a measurement chamber 101. The measurement chamber 101 comprises a standard 6-inch poly(vinyl chloride) pipe T-piece to which is welded a poly(vinyl chloride) flange 110. Opposite the upright portion of the T-piece there is provided an orifice to accommodate a sleeve member 111 having a flange 112. The measuring head 105 is inserted into the sleeve member 111 and held in place by means of clamps (not shown). An O-ring seal 106 is disposed between the measuring head 5 and the sleeve portion 111. To the flange 110 there are bolted a gasket 113, a light-reflecting plate 107 of white poly(vinyl chloride), and finally a protective cover plate 108.

Figure 5:
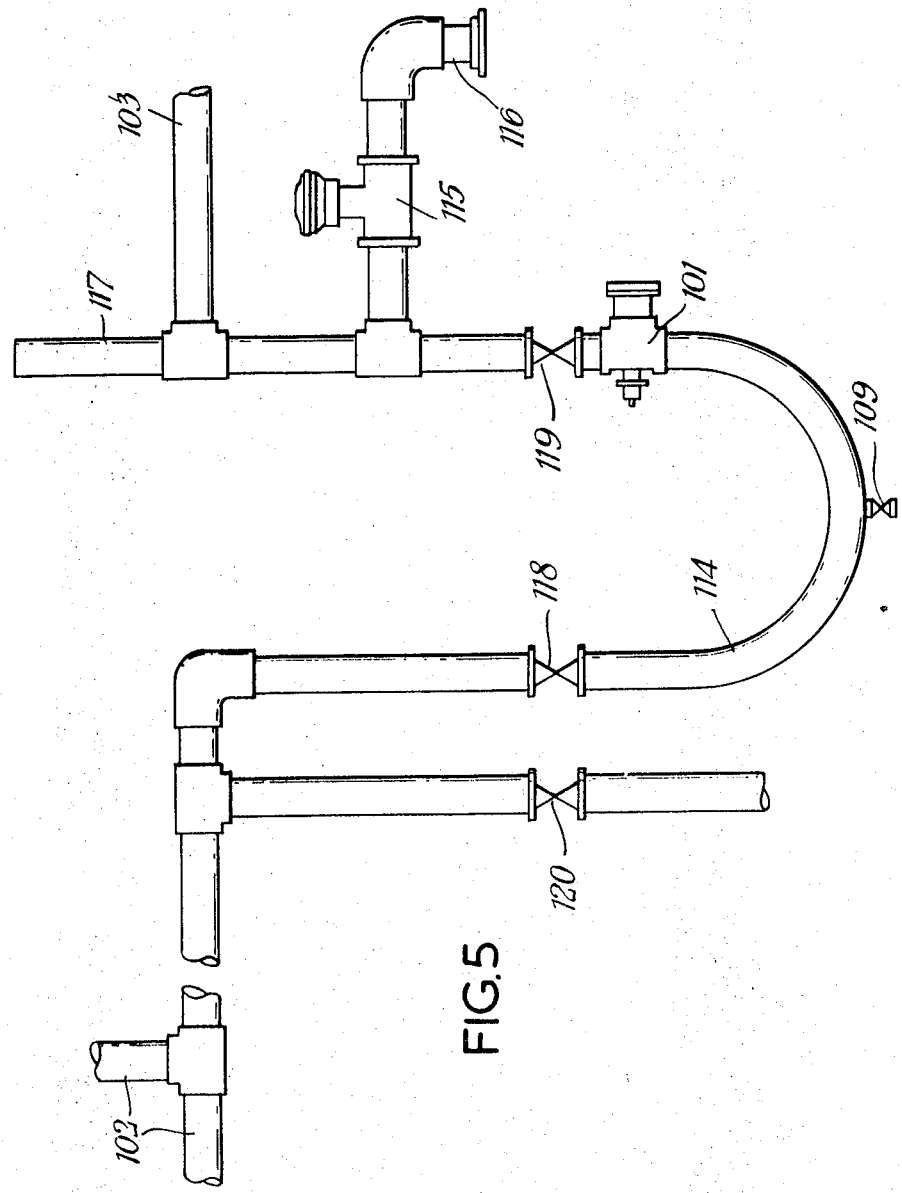
FIG. 5 shows part of a china clay-dewatering plant incorporating the apparatus shown in FIG. 4.

As shown more clearly in FIG. 5, the measurement chamber 101 is of the flow-through type and is incorporated in a device for monitoring the solids content of an aqueous effluent for discharge to a river or stream. Aqueous effluent enters the system through a number of conduits, e.g. conduits 102, and passes through a U-shaped section of pipe 114 in one branch of which is mounted the measurement chamber 101. The rate of flow of the effluent should not be less than 0.04 feet per second or more than 0.04 feet per second. If the solids content of the effluent passing through the measurement chamber 101 rises above a certain predetermined figure a signal from the measuring head opens a pneumatically operated diaphragm valve 115 and the effluent flows along a conduit 116 to a retreatment plant. If the solids content of the effluent is within acceptable limits the effluent leaves the system through a conduit 103 and is discharged to a river or stream. An open-ended conduit 117 is provided to prevent syphoning.

In order to clean the window of the measuring head valves 118 and 119 are provided to isolate the U-section 114 in which the measurement chamber is mounted. When valves 118 and 119 are closed, a valve 120 can be opened to deliver all the effluent to the retreatment plant. A drain valve 109 is provided to empty the U-section when necessary. It is essential that the measurement head should be immersed in water all the time that the lamp is burning in order to keep the measurement head cool, and the U-section is provided for this reason. It is also important to keep the measurement head immersed in water during use of the apparatus in order to prevent an air/water interface from impinging on the window.

We claim:

1. An apparatus for determining the concentration of solids in suspension in a chamber, and apparatus comprises (a) a lamp producing a single beam of light, (b) a measurement chamber of generally cylindrical shape which is adapted to contain a quantity of said suspension and to admit thereinto only said single beam of light from said lamp and the end wall of which is in the direct water, the of said beam of light from said lamp and is provided with a weakly light-reflecting surface, (c) a first photocell adapted to receive light originating from said lamp and reflected through an angle of 180° by solid particles in the suspension and to produce a signal proportional to the intensity of the reflected light, (d) second photocell arranged to receive light directly thereon from said lamp and to produce a signal proportional to the intensity of the light, (e) a neutral optical filter which is disposed between the second photocell and said lamp so that the intensity of the light received by the second photocell is of the same order as that received by the first photocell, (f) a measuring head which houses the lamp, the first photocell, the second photocell and the neutral optical filter, and which includes a window through which said single beam of light can be directed, the measuring head being mounted in the region of the other end wall of the cylindrical measurement chamber, and (g) means for comparing the signals produced by the first and second photocells as a function of the solids concentration of the suspension in the measurement chamber; the power of the lamp, the length of the measurement chamber and the light-reflecting ability of said weakly light-reflecting surface being such that, if the measurement chamber contains pure water, the signal produced by the first photocell corresponds to that which would be produced if the measurement chamber were of infinite length and contained about 10 p.p.m. of suspended solids.

2. An apparatus as claimed in claim 1, wherein the measurement chamber has a length ranging from 2 inches to 20 inches, and the lamp has a power of from 3 to 12 watts.

3. An apparatus as claimed in claim 1, wherein the measuring head is mounted axially in said other end wall of the cylindrical measurement chamber and wherein the diameter of the window of the measuring head is sufficiently small, compared with the diameter of the measurement chamber, for no more than negligible light to be reflected from the cylindrical wall of the chamber to the first photocell.

4. An apparatus as claimed in claim 3, wherein the measurement chamber has a diameter of at least 3 inches and the window has a diameter of less than 1 inch.

5. An apparatus as claimed in claim 1, wherein said window is formed from a transparent plastics material and wherein the first and second photocells and the neutral optical filter are embedded in said window on the axis of said window.

6. An apparatus as claimed in claim 1, wherein the measuring head is mounted in an orifice in said other end wall of the measurement chamber.

7. An apparatus as claimed in claim 1, wherein the measurement chamber is provided with an inlet and an outlet whereby a suspension can be caused to flow through the measurement chamber.

8. An apparatus as claimed in claim 1, wherein means are provided to ensure that the suspension flows through the measurement chamber at a linear flow rate of at least 0.04 feet per second.

* * * * *